(12) United States Patent
Tsujimoto et al.

(10) Patent No.: US 7,472,678 B2
(45) Date of Patent: Jan. 6, 2009

(54) COMBUSTION CHAMBER SHAPE OF DIRECT INJECTION TYPE DIESEL ENGINE

(75) Inventors: Keiichi Tsujimoto, Osaka (JP); Shunji Hamaoka, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 11/629,707

(22) PCT Filed: May 25, 2005

(86) PCT No.: PCT/JP2005/009545

§ 371 (c)(1),
(2), (4) Date: Dec. 15, 2006

(87) PCT Pub. No.: WO2006/006308

PCT Pub. Date: Jan. 19, 2006

(65) Prior Publication Data

US 2007/0272191 A1  Nov. 29, 2007

(30) Foreign Application Priority Data

Jul. 9, 2004  (JP)  ............................. 2004-203257

(51) Int. Cl.
*F02B 23/02* (2006.01)
*F02B 23/06* (2006.01)
*F02F 3/26* (2006.01)
(52) U.S. Cl. ..................... 123/299; 123/193.6; 123/276
(58) Field of Classification Search .............. 123/193.6, 123/276, 279, 299, 262, 263, 300, 305
See application file for complete search history.

(56) References Cited

U.S. PATENT DOCUMENTS 2,828,724 A * 4/1958 Schneider .................. 123/276

(Continued)

FOREIGN PATENT DOCUMENTS

EP    1357274 A1 * 10/2003

(Continued)

*Primary Examiner*—Willis R Wolfe, Jr.
(74) *Attorney, Agent, or Firm*—Crowell & Moring LLP

(57) ABSTRACT

An object of the present invention is to provide a combustion chamber shape of a direct injection type diesel engine in which a black smoke generation amount can be suppressed during no-load operation while suppressing NOx and fuel consumption. The combustion chamber 5 is formed in a recessed shape in a piston top wall 3 and injecting fuel at a predetermined nozzle hole angle α into the combustion chamber 5 from a nozzle hole 20 of a fuel injection valve having a nozzle hole center O1 substantially on a cylinder center line. A wall face of the combustion chamber 5 includes: a conical mountain portion 12 formed at a central portion in the combustion chamber and having such a slope angle and skirt end diameter D2 that fuel spray does not collide with the mountain portion; a slope portion 14 that inclines downward and outward from a skirt end of the mountain portion 12 at a smaller angle than the slope angle of the mountain portion 12 and with which the fuel spray collides; and a saucer portion 15 which rises in an arc shape from an outer peripheral end of the slope portion 14 to reach an outer peripheral end of the combustion chamber and with which the fuel spray collides.

4 Claims, 4 Drawing Sheets

U.S. PATENT DOCUMENTS

| | | | |
|---|---|---|---|
| 2,914,044 A * | 11/1959 | Liebel | 123/276 |
| 4,281,629 A * | 8/1981 | List | 123/279 |
| 4,311,122 A * | 1/1982 | Banba et al. | 123/279 |
| 4,364,342 A * | 12/1982 | Asik | |
| 5,029,563 A * | 7/1991 | Hu | 123/276 |
| 5,099,809 A * | 3/1992 | Kawatani et al. | 123/276 |
| 5,868,112 A * | 2/1999 | Mahakul et al. | 123/263 |
| 6,739,308 B1 * | 5/2004 | Curtis | 123/276 |
| 6,799,551 B2 * | 10/2004 | Nakakita et al. | 123/279 |
| 7,032,566 B2 * | 4/2006 | Cavanagh et al. | 123/299 |

FOREIGN PATENT DOCUMENTS

| | | |
|---|---|---|
| JP | 05-106442 A | 4/1993 |
| JP | 07-189701 A | 7/1995 |
| JP | 08-028276 A | 1/1996 |
| JP | 10-184365 A | 7/1998 |
| JP | 2001-115844 A | 4/2001 |
| JP | 2002-349267 A | 12/2002 |
| JP | 2003-214297 A | 7/2003 |

* cited by examiner

Prior Art

COMBUSTION CHAMBER SHAPE OF DIRECT INJECTION TYPE DIESEL ENGINE

TECHNICAL FIELD

The present invention relates to a combustion chamber shape of a direct injection type diesel engine.

BACKGROUND ART

FIG. 8 shows an example (Patent Document 1) of a prior-art combustion chamber shape in a direct injection type diesel engine. A combustion chamber (cavity) 106 in a shallow dish recessed shape is formed in a top wall 102 of a piston 101. On a wall face of the combustion chamber 106, a mountain portion 104 spreading from a center of the combustion chamber 106 and sloping gently to a vicinity of an outer peripheral end portion of the combustion chamber is formed and a saucer portion 105 seamlessly connected to a skirt end of the mountain portion 104 and rising in an arc shape is formed. A fuel injection valve 103 is mounted to a cylinder head 110 so that a center O1 of a nozzle hole is positioned on a cylinder center line C1 and injects fuel in a conical shape toward the saucer portion 105 of the combustion chamber 106 at a predetermined nozzle hole angle α.

In a structure in FIG. 8, about a half of fuel spray directly collides with a slope of the mountain portion 104 to thereby suppress fuel and a NOx generation amount. However, during no-load operation, a proportion of the fuel adhering to the slope of the mountain portion 104 increases due to reduction in injection pressure to thereby increase black smoke.

Patent Document 1: Japanese Patent Application Laid-open No. 5-106442

DISCLOSURE OF INVENTION

Problems to be Solved by the Invention

In the structure as shown in FIG. 8, it is effective to reduce a nozzle hole area of the fuel injection valve 103 to increase the injection pressure as a measure to suppress generation of the black smoke during the no-load operation. In this way, it is possible to facilitate atomization of the fuel during the no-load operation to suppress generation of the black smoke.

However, if the nozzle hole area of the fuel injection valve is reduced, a fuel injection time during a load operation becomes long to thereby worsen fuel consumption.

Another effective measure to suppress generation of the black smoke is to increase the nozzle hole angle α in FIG. 8 to increase a spray travel to thereby direct the major portion of the fuel spray to the vicinity of the outer peripheral edge portion of the combustion chamber 106. In this way, generation of the black smoke can be suppressed, but the NOx generation amount during load operation increases because combustion control on the wall face of the combustion chamber is not carried out. Moreover, flame becomes likely to collide with a cylinder liner 112 to heat the cylinder liner 112 to thereby cause problems in reliability and durability of the cylinder liner 112.

Object of the Invention

It is an object of the present invention to provide a combustion chamber shape of a diesel engine in which a black smoke generation amount can be suppressed during no-load operation while suppressing NOx and maintaining fuel consumption at satisfactory values during load operation.

Means for Solving the Problems

In order to achieve the above object, according to an invention of claim 1 of the present application, there is provided a combustion chamber shape of a direct injection type diesel engine having a combustion chamber formed in a recessed shape in a piston top wall and injecting fuel at a predetermined nozzle hole angle into the combustion chamber from a nozzle hole having a nozzle hole center substantially on a cylinder center line, wherein a wall face of the combustion chamber includes: a mountain portion formed at a central portion in the combustion chamber and having such a slope angle and skirt end diameter that fuel spray does not collide with the mountain portion; a slope portion that inclines downward and outward from a skirt end of the mountain portion at a smaller angle than the slope angle of the mountain portion and with which the fuel spray collides; and a saucer portion which rises in an arc shape from an outer peripheral end of the slope portion to reach an outer peripheral end of the combustion chamber and with which the fuel spray collides.

According to an invention of claim 2, there is provided a combustion chamber shape of a direct injection type diesel engine according to claim 1, wherein, in the mountain portion, a ratio H2/H1 of a mountain portion height H2 from a combustion chamber bottom face to a combustion chamber depth H1 is $0.7 \leq H2/H1 \leq 1.0$, a ratio D1/B of a diameter D1 of a mountain portion top face to a bore diameter B is $D1/B \leq 0.3$, and a ratio D2/B of a diameter D2 of the skirt end of the mountain portion to the bore diameter B is $D2/B \leq 0.5$.

According to an invention of claim 3, there is provided a combustion chamber shape of a direct injection type diesel engine according to claim 1 or 2, wherein a ratio L/d of a spray travel L to a nozzle hole diameter d is $150 \leq L/d \leq 250$.

According to an invention of claim 4, there is provided a combustion chamber shape of a direct injection type diesel engine according to any one of claims 1 to 3, wherein the slope angle θ of the slope portion is $0° < \theta \leq 15°$.

More effective Advantages than Prior Art (1) The combustion chamber wall face is formed with the slope portion inclining downwardly to outside between the central mountain portion and the arc-shaped saucer portion at the outer peripheral end portion so that the fuel spray does not collide with the slope of the mountain portion but comes in contact with the area from the slope portion to the saucer portion. Therefore, during the no-load operation, the fuel spray becomes less likely to adhere to the slope of the mountain portion to thereby suppress generation of the black smoke. Moreover, by causing the fuel spray to collide with the area from the slope face to the saucer portion to disperse the fuel spray, it is possible to suppress a NOx generation amount during load operation. Furthermore, because it is unnecessary to reduce a nozzle hole area in order to increase injection pressure, it is possible to reduce fuel consumption during the load operation.

(2) Because the ratio of the mountain portion height H2 to the combustion chamber depth H1 is $0.7 \leq H2/H1 \leq 1.0$, the ratio of the diameter D1 of the mountain portion top face to the bore diameter B is $D1/B \leq 0.3$, and the ratio of the diameter D2 of the skirt end of the mountain portion to the bore diameter B is $D2/B \leq 0.5$ while maintaining a compression ratio constant, it is possible to enhance the black smoke suppressing effect during the no-load operation.

(3) Because the ratio of the spray travel L to the nozzle hole diameter d is $150 \leq L/d \leq 250$, it is possible to effectively use air in a top clearance portion T while suppressing combustion at the slope portion and the saucer portion. Therefore, it is possible to reduce the fuel consumption while suppressing NOx during the load operation.

(4) Because the slope angle θ of the slope portion is 0°≦θ≦15°, it is possible to smoothly lead the fuel spray from the slope portion to the saucer portion and the top clearance portion to thereby reduce the fuel consumption while suppressing NOx during the load operation.

DESCRIPTION OF NOTATIONS

Figure 1:
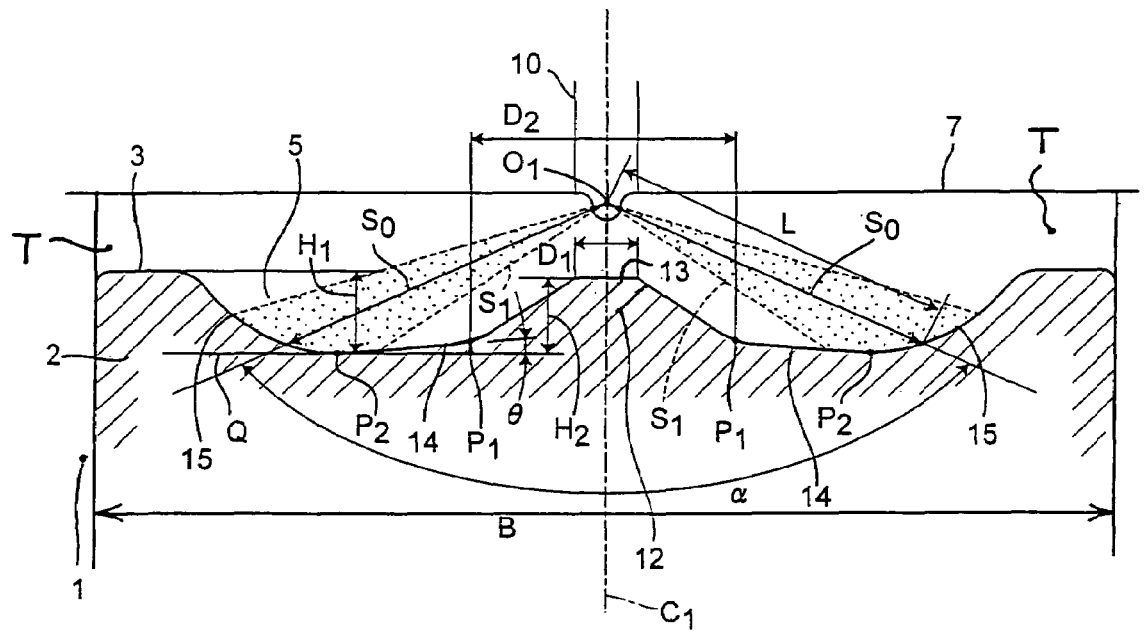
FIG. 1 is a vertical sectional enlarged view of a combustion chamber of a direct injection type diesel engine to which the present invention is applied.

1 Cylinder liner
2 Piston
3 Piston top wall
5 Combustion chamber
7 Cylinder head
10 Fuel injection valve
12 Mountain portion
13 Top face of mountain portion
14 Slope portion
15 Saucer portion
20 Nozzle hole

MODE FOR CARRYING OUT THE INVENTION

Embodiment 1

[Structure of Combustion Chamber]

FIG. 1 is an enlarged vertical sectional view of a combustion chamber of a direct injection type diesel engine to which the present invention is applied. In FIG. 1, a piston 2 is fitted in a cylinder liner 1 of a cylinder block, a combustion chamber (cavity) 5 is formed on a top wall 3 of the piston 2, and an upper portion of the combustion chamber 5 is closed with a lower face of a cylinder head 7. A fuel injection valve 10 with its nozzle hole center O1 positioned on a cylinder center line C1 is mounted to the cylinder head 7 and injects (sprays) fuel in a conical shape at a nozzle hole angle α. In FIG. 1, the piston 2 is positioned at a top dead center.

The combustion chamber 5 is formed in a shallow dish shape, where a portion mountain 12 in a shape of a truncated cone is formed at a central portion (on the cylinder center line C1) and a saucer portion 15 gently rising outward in an arc shape is formed in an annular shape at an outer peripheral portion. Between the saucer portion 15 and the central mountain portion 12, a slope portion 14 inclining downward and outward at a predetermined angle θ with respect to a plane Q orthogonal to the cylinder center line C1 is formed in an annular shape. An inner peripheral end of the slope portion 14 and a skirt end portion of the mountain portion 12 are seamlessly connected to each other through a curved face at a boundary P1 and an outer peripheral end of the slope portion 14 and an inner peripheral end of the saucer portion 15 are seamlessly connected to each other at a boundary P2.

The mountain portion 12 is formed ,in condition that a compression ratio is constant, so that a ratio H2/H1 of a mountain portion height H2 from a bottom face of the combustion chamber to a combustion chamber depth H1 is in a range of 0.7≦H2/H1≦1.0, that a ratio D1/B of a diameter D1 of a top face 13 of the mountain portion to a bore diameter B is in a range of D1/B≦0.3, and that a ratio D2/B of a diameter D2 of the skirt end (P1) of the mountain portion 12 to the bore diameter B is in a range of D2/B0.5. A slope of the mountain portion 12 is at least at a certain distance from a minimum spray angle range s1 of the fuel spray so that the fuel spray does not collide with the slope of the mountain portion 12.

The inclination angle θ of the slope portion 14 is much smaller than an angle of the slope of the central mountain portion 10 and the slope portion 14 is formed in such an area that about an inner half of the whole spray angle can collide with the slope portion 14.

The saucer portion 15 gently rises and is formed in such an area that a center line S0 of the fuel spray collides with a vicinity of the boundary P2 between the slope portion 14 and the saucer portion 15.

Figure 2:
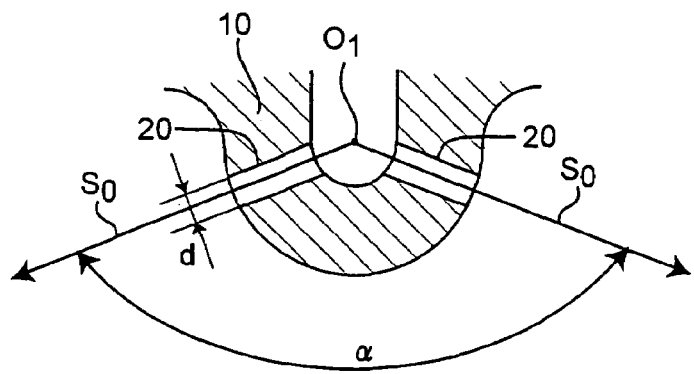
FIG. 2 is a vertical sectional enlarged view of a nozzle hole portion of a fuel injection valve in FIG. 1.

A length of the fuel spray center line S0 from the nozzle hole center O1 to the saucer portion 15, i.e., a so-called spray travel L is set with respect to a nozzle hole diameter d shown in FIG. 2 so that L/d is in a range of 150 to 250 and is preferably about 160 to 210.

[Grounds for Limitation of Values]

Figure 3:
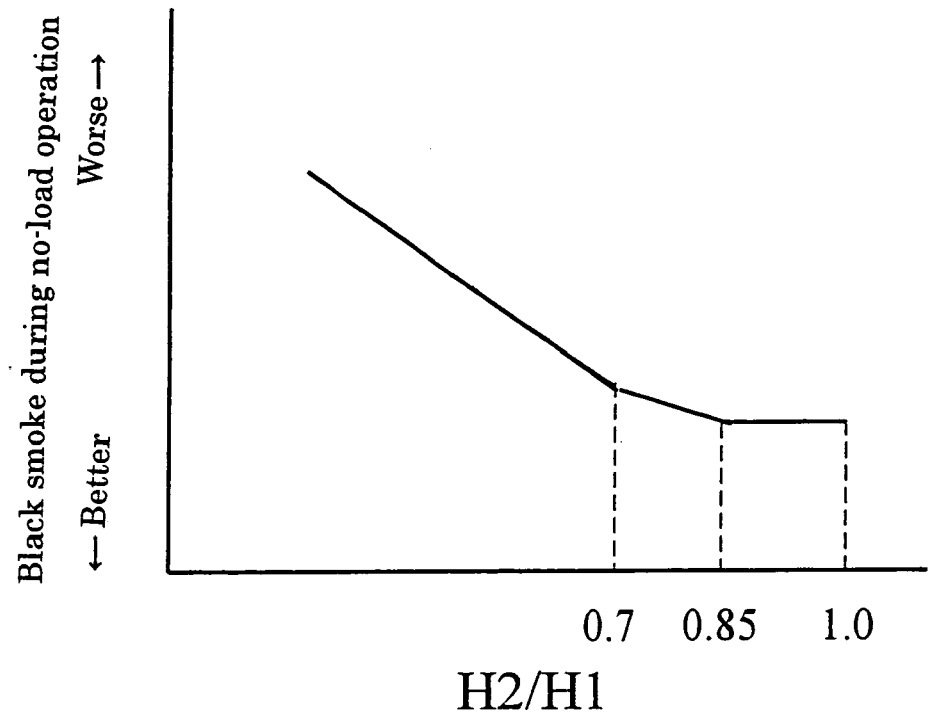
FIG. 3 is a drawing showing a relationship between change in a ratio H2/H1 of a mountain portion height H2 from a bottom face of the combustion chamber to a combustion chamber depth H1 and black smoke (black smoke concentration) during no-load operation.

FIG. 3 is a drawing showing a relationship between change in a ratio H2/H1 of a mountain portion height H2 to a combustion chamber depth H1 and black smoke (black smoke concentration) during no-load operation when the compression ratio is maintained constant. As can be understood from FIG. 3, in a range in which the above ratio H2/H1 is 0.85 to 1.00, a black smoke generation amount is suppressed to a minimum value and does not change. In a range in which the above ratio H2/H1 decreases from 0.85 to 0.7, the black smoke generation amount increases mildly. If the above ratio H2/H1 becomes smaller than 0.7, the black smoke generation amount increases sharply. Therefore, by setting the above ratio H2/H1 in a range of 0.7≦H2/H1≦1.0, it is possible to suppress the black smoke generation amount in a permissible range. Preferably, by setting the ratio in a range of 0.85≦H2/H1≦1.0, it is possible to effectively suppress the black smoke generation amount.

Figure 4:
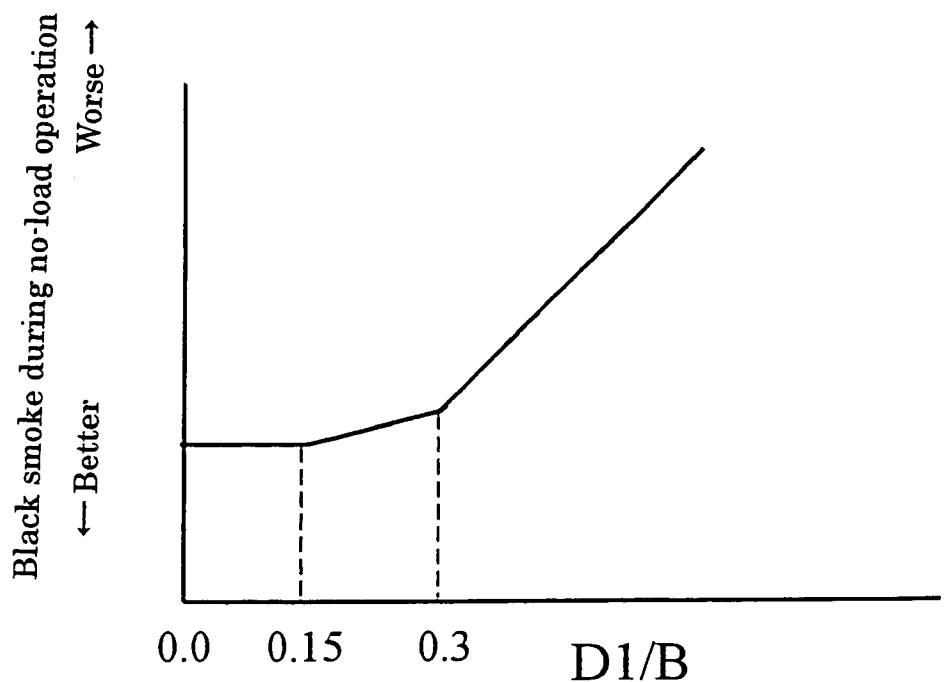
FIG. 4 is a drawing showing a relationship between change in a ratio D1/B of a diameter D1 of a top face of the mountain portion to a bore diameter B and the black smoke (black smoke concentration) during the no-load operation.

FIG. 4 is a drawing showing a relationship between change in a ratio D1/B of a diameter D1 of a top face 13 of the mountain portion to a bore diameter B and the black smoke (black smoke concentration) during the no-load operation. As can be understood from FIG. 4, in a range in which the above ratio D1/B is 0.3 or smaller, the black smoke during the no-load operation is maintained in a satisfactory state. Especially in a range in which the above ratio D1/B is 0.15 or smaller, the black smoke is suppressed to a minimum value. On the other hand, if the above ratio D1/B becomes greater than 0.3, the black smoke increases sharply. Therefore, by setting the above ratio D1/B in a range of D1/B≦0.3, it is possible to suppress the black smoke generation amount in a permissible range. Preferably, by setting the ratio in a range of D1/B≦0.15, it is possible to effectively suppress the black smoke generation amount.

Figure 5:
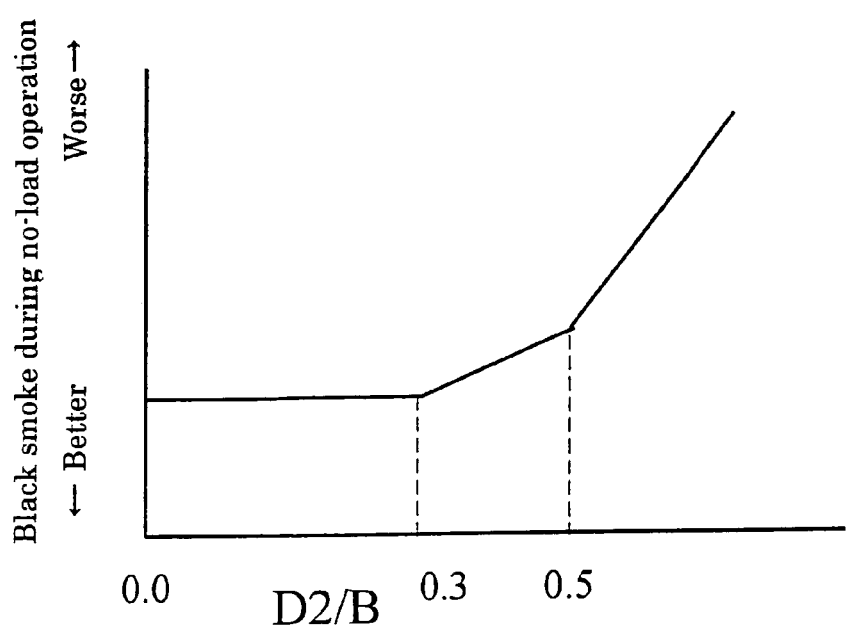
FIG. 5 is a drawing showing a relationship between change in a ratio D2/B of a diameter D2 of a skirt end of the mountain portion to the bore diameter B and the black smoke (black smoke concentration) during the no-load operation.

FIG. 5 is a drawing showing a relationship between change in a ratio D2/B of a diameter D2 of the skirt end P1 of the mountain portion 12 to the bore diameter B and the black smoke (black smoke concentration) during the no-load operation. As can be understood from FIG. 5, in a range in which the above ratio D2/B is 0.5 or smaller, the black smoke during the no-load operation is maintained in a satisfactory state. Especially in a range in which the above ratio D2/B is 0.3 or smaller, the black smoke is suppressed to a minimum value. On the other hand, if the above ratio D1/B becomes greater than 0.5, the black smoke increases sharply. Therefore, by setting the above ratio D2/B in a range of D2/B≦0.5, it is possible to suppress the black smoke generation amount in a permissible range. Preferably, by setting the ratio in a range of D2/B≦0.3, it is possible to effectively suppress the black smoke generation amount.

Figure 6:
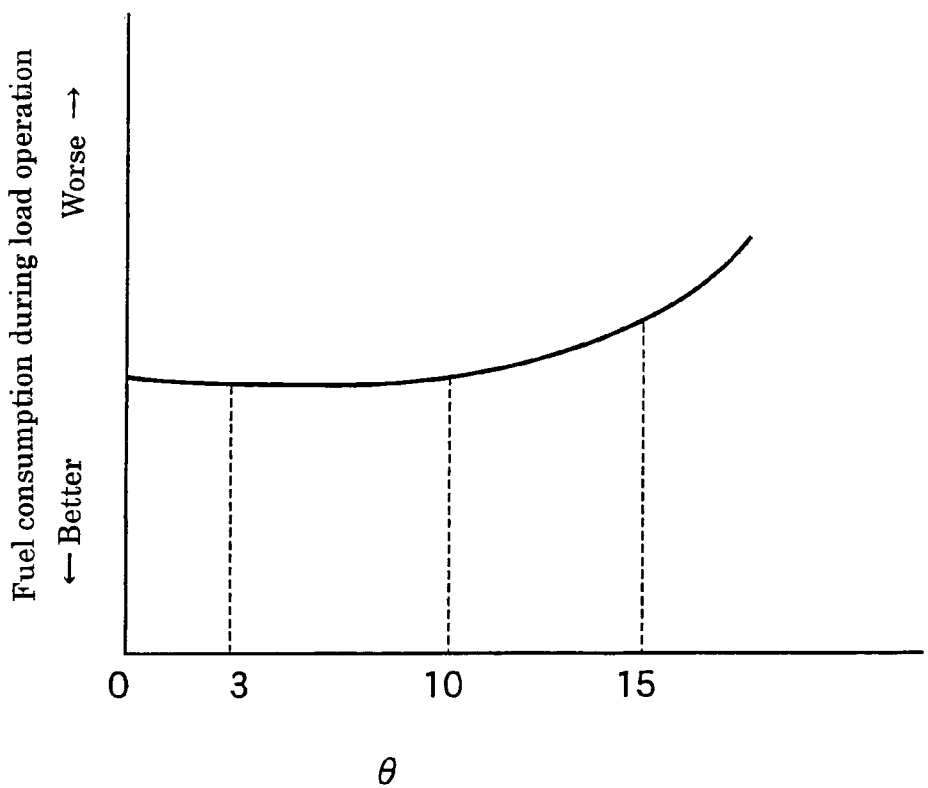
FIG. 6 is a graph showing a relationship between change in an inclination angle θ of a slope portion and fuel consumption during load operation.

FIG. 6 is a graph showing a relationship between change in an inclination angle θ of a slope portion 14 and fuel consumption during load operation. As can be understood from FIG. 6, in a range in which the above inclination angle θ is greater than 0° and equal to or smaller than 15°, the fuel consumption is maintained at a preferable value. Especially in a range in which the inclination angle θ is 3 to 10°, the fuel consumption is in the best state. On the other hand, if the inclination angle θ exceeds 15°, the fuel consumption worsens sharply.

Figure 7:
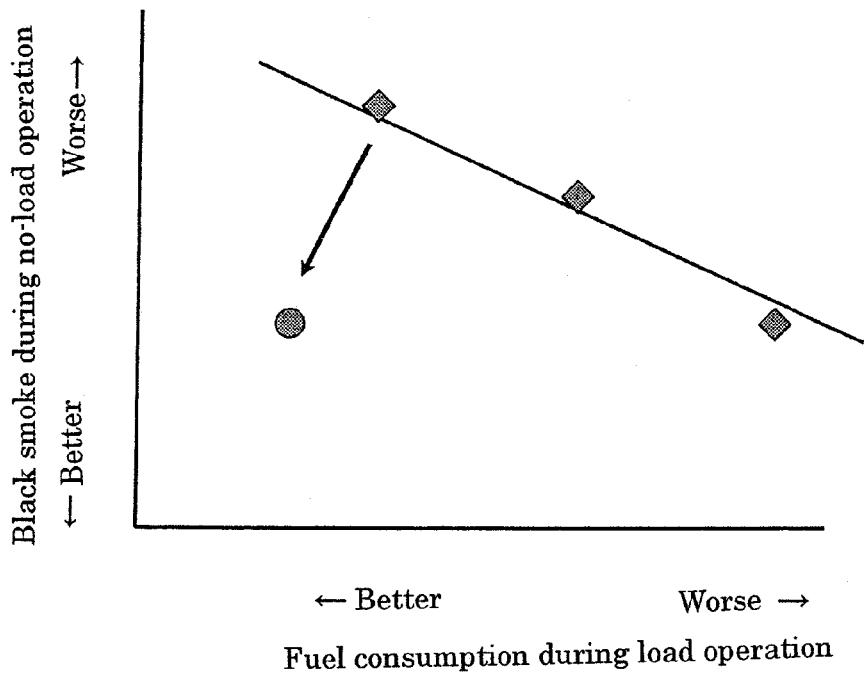
FIG. 7 is a drawing showing a relationship between the black smoke during the no-load operation and the fuel consumption during the load operation.
Figure 8:
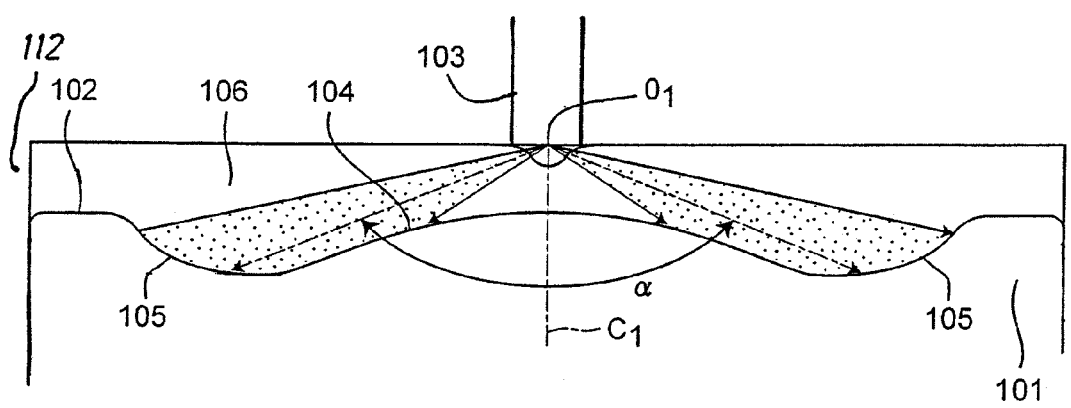
FIG. 8 is a vertical sectional enlarged view of a prior-art combustion chamber.

FIG. 7 schematically shows a relationship between the black smoke during the no-load operation and the fuel consumption or cost during the load operation, where the prior-art in FIG. 8 is marked with ♦ (diamond symbol) and the present embodiment is marked with ● (circle symbol). If NOx levels are the same, enhancement of the fuel consumption in the prior art results in increase in the black smoke (black smoke concentration) during the no-load operation while the fuel consumption can be enhanced while maintaining the black smoke concentration during the no-load operation at a substantially constant small value in the embodiment.

In other words, in the embodiment, because 0.7≦H2/H1≦1.0, D1/B≦0.3, and D2/B≦0.5, the fuel spray does not collide with the slope of the mountain portion 12 of the combustion chamber 5 and the fuel hardly adheres to the slope of the mountain portion 12. As a result, the black smoke generation amount during the no-load operation can be suppressed and therefore it is possible to increase a nozzle hole 20 of the fuel injection valve 10 in size and to reduce the fuel consumption. Moreover, because the ratio L/d of the spray travel L to the nozzle hole diameter d is 150≦L/d≦250 so that the fuel spray reaches an area from the slope portion 14 to the saucer portion 15, it is possible to enhance an air utilization factor in a top clearance portion T while suppressing combustion on an inner face of the combustion chamber 5 and to reduce the fuel consumption while suppressing NOx. Furthermore, because the inclination angle θ of the slope portion 14 is 0°≦θ≦15° it is possible to smoothly disperse the fuel that has collided with the slope portion 14 from the saucer portion 15 to the top clearance portion T (FIG. 1) to thereby suppress NOx, suppress the black smoke, and reduce the fuel consumption.

The invention claimed is:

1. A combustion chamber shape of a direct injection type diesel engine having a combustion chamber formed in a recessed shape in a piston top wall and injecting fuel at a predetermined nozzle hole angle into the combustion chamber from a nozzle hole of a fuel injection valve having a nozzle hole center substantially on a cylinder center line,
   wherein a wall face of the combustion chamber includes:
      a conical mountain portion formed at a central portion in the combustion chamber and having such a slope angle and skirt end diameter that fuel spray does not collide with the mountain portion;
      a slope portion that inclines downward and outward from a skirt end of the mountain portion at a smaller angle than the slope angle of the mountain portion and with which the fuel spray collides; and
      a saucer portion which rises in an arc shape from an outer peripheral end of the slope portion to reach an outer peripheral end of the combustion chamber and with which the fuel spray collides.
   wherein, in the mountain portion, a ratio H2/H1 of a mountain portion height H2 from a combustion chamber bottom face to a combustion chamber depth H1 is 0.7≦H2/H1≦1.0,
   a ratio D1/B of a diameter D1 of a mountain portion top face to a bore diameter B is D1/B≦0.3, and
   a ratio D2/B of a diameter D2 of the skirt end of the mountain portion to the bore diameter B is D2/B0.5.

2. A combustion chamber shape of a direct injection type diesel engine according to claim 1, wherein a ratio L/d of a spray travel L to a nozzle hole diameter d is 150≦L/d≦250.

3. A combustion chamber shape of a direct injection type diesel engine according to claim 1, wherein the slope angle θ of the slope portion is 0°<θ≦15°.

4. A combustion chamber shape of a direct injection type diesel engine according to claim 2, wherein the slope angle θ of the slope portion is 0°<θ≦15°.

* * * * *